US012046824B2

(12) United States Patent
He et al.

(10) Patent No.: US 12,046,824 B2
(45) Date of Patent: Jul. 23, 2024

(54) ULTRA-WIDEBAND CROSS-POLARIZED ANTENNA AND ULTRA-WIDEBAND CROSS-POLARIZED ARRAY ANTENNA

(71) Applicant: SHENZHEN SUNWAY COMMUNICATION CO., LTD., Guangdong (CN)

(72) Inventors: Ziming He, San Diego, CA (US); Hongwei Liu, San Diego, CA (US); Neo Su, Shenzhen (CN); Xiaoting Yuan, Shenzhen (CN)

(73) Assignee: SHENZHEN SUNWAY COMMUNICATION CO., LTD., Shenzhen (CN)

( * ) Notice: Subject to any disclaimer, the term of this patent is extended or adjusted under 35 U.S.C. 154(b) by 170 days.

(21) Appl. No.: 17/885,193

(22) Filed: Aug. 10, 2022

(65) Prior Publication Data

US 2024/0055776 A1 Feb. 15, 2024

(51) Int. Cl.

| | |
|---|---|
| ***H01Q 21/26*** | (2006.01) |
| ***H01Q 1/48*** | (2006.01) |
| ***H01Q 5/25*** | (2015.01) |
| ***H01Q 21/00*** | (2006.01) |

(52) U.S. Cl.
CPC ............... *H01Q 21/26* (2013.01); *H01Q 1/48* (2013.01); *H01Q 5/25* (2015.01); *H01Q 21/0006* (2013.01)

(58) Field of Classification Search
None
See application file for complete search history.

(56) References Cited

U.S. PATENT DOCUMENTS

| | | | | |
|---|---|---|---|---|
| 11,177,582 | B2 * | 11/2021 | Seo | H01Q 9/0457 |
| 2017/0288312 | A1 * | 10/2017 | Koskiniemi | H01Q 1/48 |
| 2022/0077593 | A1 * | 3/2022 | Lee | H01Q 9/0457 |
| 2023/0253719 | A1 * | 8/2023 | Bhattacharya | H01Q 21/26 343/795 |

* cited by examiner

*Primary Examiner* — Jany Richardson
(74) *Attorney, Agent, or Firm* — Oliff PLC

(57) ABSTRACT

The present invention discloses an ultra-wideband cross-polarized antenna and ultra-wideband cross-polarized array antenna, including a substrate, and a first polarized antenna and a second polarized antenna provided in the substrate and orthogonal to each other. The ultra-wideband cross-polarized antenna has a simple structure, is easy to produce and is able to solve challenging bandwidth issues, cross-polarized port isolation issues, and beam scanning range issues in 5G millimeter wave array antennas.

20 Claims, 11 Drawing Sheets

ULTRA-WIDEBAND CROSS-POLARIZED ANTENNA AND ULTRA-WIDEBAND CROSS-POLARIZED ARRAY ANTENNA

TECHNICAL FIELD

The present invention relates to an antenna, specifically to an ultra-wideband cross-polarized antenna and ultra-wideband cross-polarized array antenna for millimeter wave or other frequency band applications.

BACKGROUND ART

The statements herein merely provide background information related to the present invention and do not necessarily constitute the prior art.

At present, most 5G millimeter wave array antennas use patch elements, which are convenient for feeding, but have narrow bandwidths, low isolations between two cross-polarized ports and narrow beam scanning ranges. To improve performances of patch antenna elements, complex structures such as multilayer PCBs stacking, aperture coupling, and multiple parasitic elements are often used.

In “A Planar Dual-Polarized Ultra-Wideband Millimeter Wave Array Antenna” (S. M. Moghaddam, J. Yang and A. A. Glazunov, Antennas and Propagation (EUCAP), 2018 12th European IEEE Conference), ultra-wide antennas for millimeter wave application have been studied in literature, where antenna elements consist of bowtie patches integrated with Γ-shaped feed probes, and the array antenna consists of tightly-coupled bowties in a dual-offset configuration. The elements are fed by 50 Ohm Coaxial Cable and the array is fed by 75 Ohm Coaxial Cable below the ground plane.

In addition, other examples of broadband antennas with integrated feed networks are magnetoelectric dipoles. However, these antennas are mostly considered for single-antenna structures, operating in the 1.6-3.8 GHz frequency band, fed through an SMA connector below the ground plane, and unsuitable for 5G millimeter wave frequency bands.

SUMMARY OF THE INVENTION

There is provided an ultra-wideband cross-polarized antenna including a substrate, a first polarized antenna and a second polarized antenna. The substrate includes a first substrate layer and a ground layer stacked in sequence; the first polarized antenna and the second polarized antenna are provided in the first substrate layer, with first polarized antenna orthogonal to the second polarized antenna.

The first polarized antenna includes a first branch, a second branch, a first ground pin, a second ground pin and a first feed structure. The first branch and the second branch are located on the same plane; the first ground pin has one end connected to the first branch, and the other end connected to the ground layer; the second ground pin has one end connected to the second branch, and the other end connected to the ground layer; and the first feed structure is located between the first ground pin and the second ground pin for providing coupling for the first branch and the second branch.

The second polarized antenna includes a third branch, a fourth branch, a third ground pin, a fourth ground pin and a second feed structure. The third branch and the fourth branch are located on the same plane; the third ground pin has one end connected to the third branch, and the other end connected to the ground layer; the fourth ground pin has one end connected to the fourth branch, and the other end connected to the ground layer; and the second feed structure is located between the third ground pin and the fourth ground pin for providing coupling for the third branch and the fourth branch.

The ultra-wideband cross-polarized antenna has a simple structure, is able to solve challenging bandwidth issues, cross-polarized port isolation issues and beam scanning range issues in 5G millimeter wave array antennas and is easy to integrate with a beamformer RFIC on a main PCB board.

Figure 19:
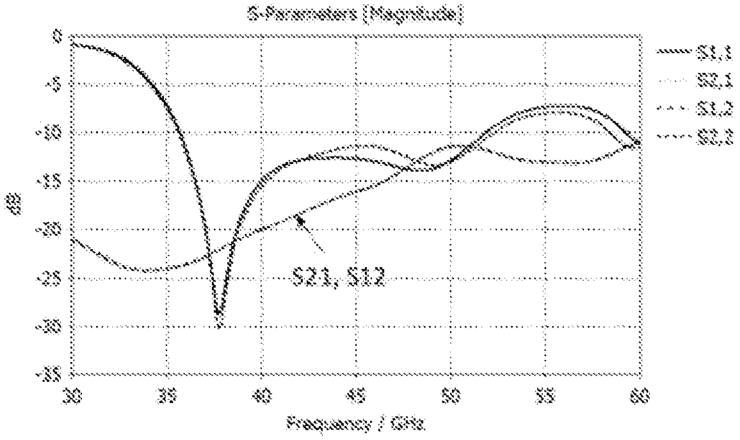

FIG. 19 shows a schematic diagram of S-parameters of an ultra-wideband cross-polarized antenna according to a possible embodiment, with the ultra-wideband cross-polarized antenna for covering a high frequency band of 5G millimeter wave applications.

Figure 20:
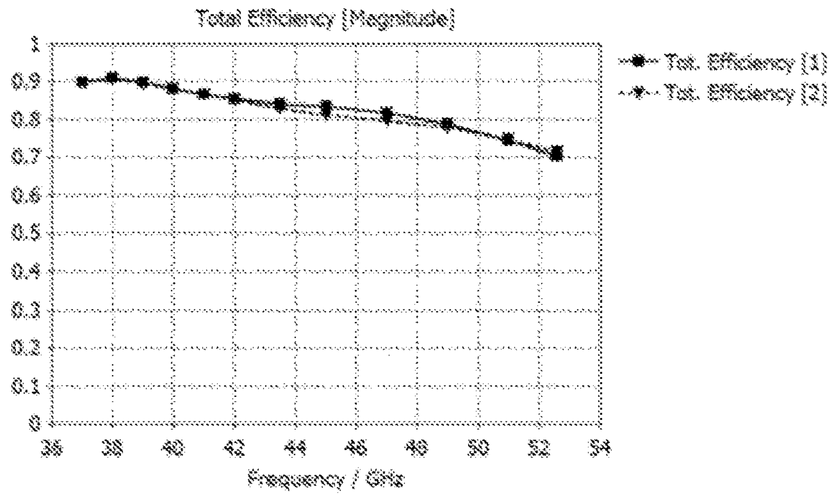

FIG. 20 shows a schematic diagram of an overall efficiency of an ultra-wideband cross-polarized antenna according to a possible embodiment, with the ultra-wideband cross-polarized antenna for covering a high frequency band of 5G millimeter wave applications.

Figure 21:
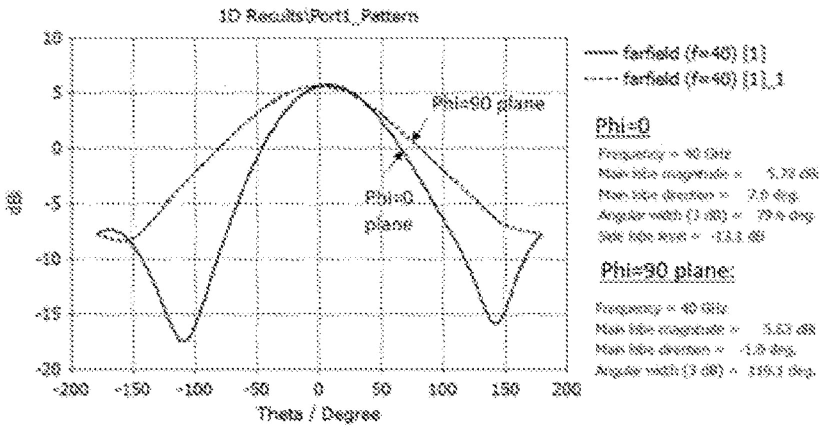

FIG. 21 shows a 2D radiation pattern of a first cross-polarized port of an ultra-wideband cross-polarized antenna according to a possible embodiment at 40 GHz, with the ultra-wideband cross-polarized antenna for covering a high frequency band of 5G millimeter wave applications.

Figure 22:
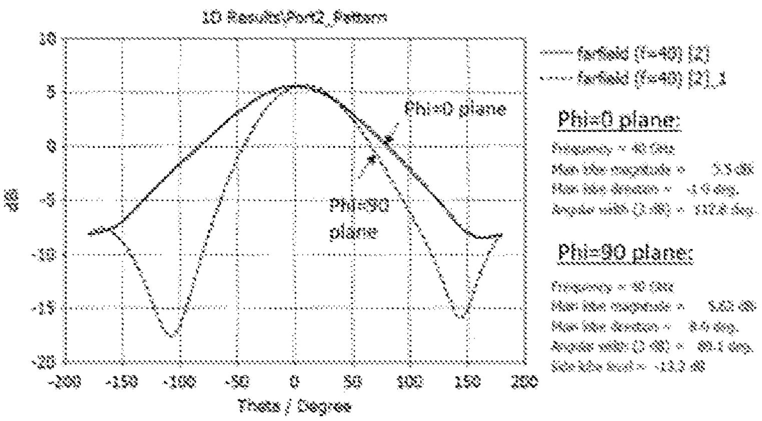

FIG. 22 shows a 2D radiation pattern of a second cross-polarized port of an ultra-wideband cross-polarized antenna according to a possible embodiment at 40 GHz, with the ultra-wideband cross-polarized antenna for covering a high frequency band of 5G millimeter wave applications.

Figure 23:
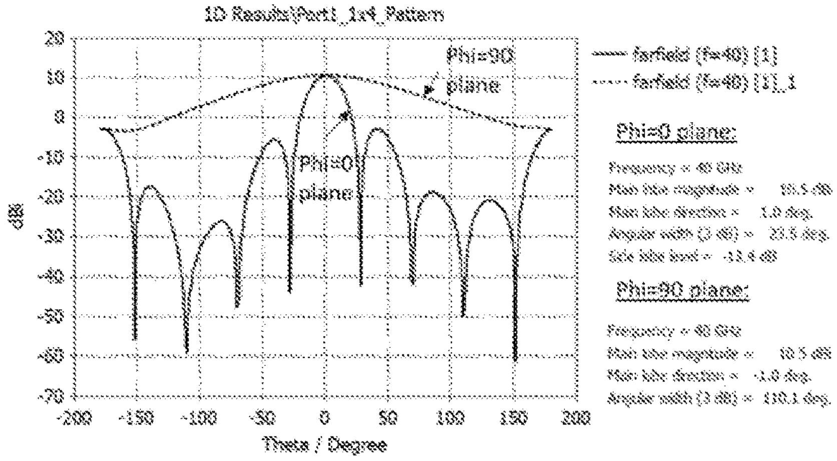

FIG. 23 shows a radiation pattern of a first cross-polarized port of a 1×4 ultra-wideband cross-polarized array antenna according to a possible embodiment at 40 GHz.

Figure 24:
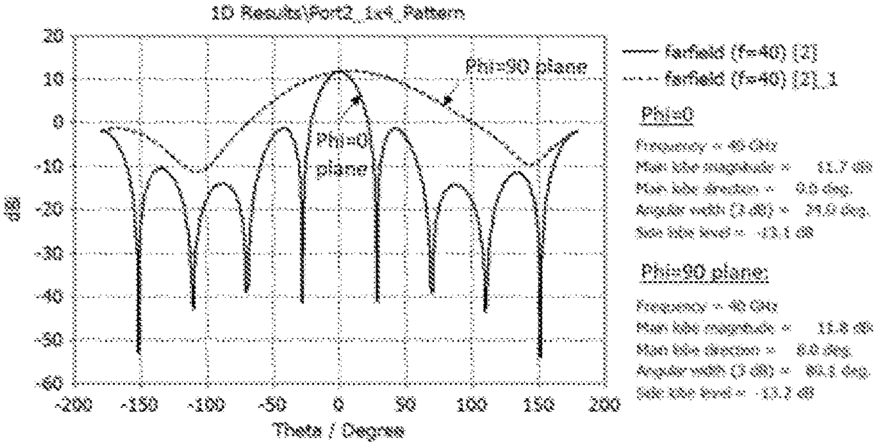

FIG. 24 shows a radiation pattern of a second cross-polarized port of a 1×4 ultra-wideband cross-polarized array antenna according to a possible embodiment at 40 GHz.

Figure 25:
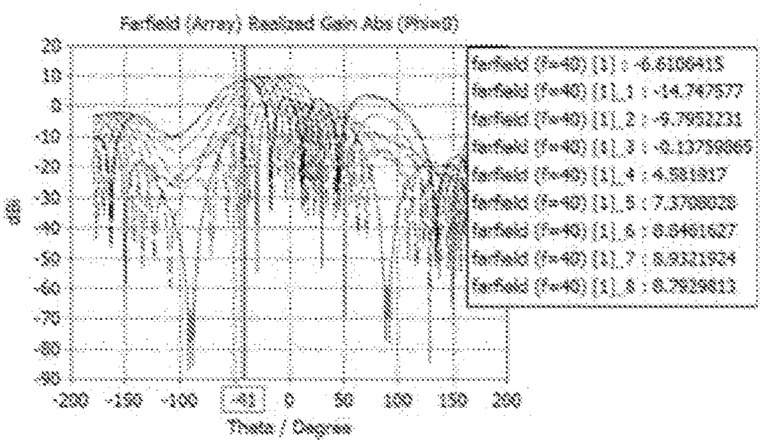

FIG. 25 shows a schematic diagram of maximum beam scanning range of a first cross-polarized port of a 1×4 ultra-wideband cross-polarized array antenna according to a possible embodiment at 40 GHz.

Figure 26:
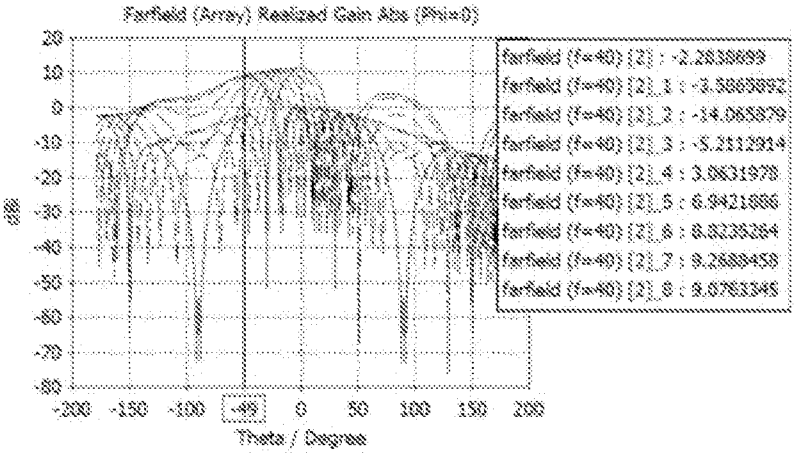

FIG. 26 shows a schematic diagram of maximum beam scanning range of a second cross-polarized port of a 1×4 ultra-wideband cross-polarized array antenna according to a possible embodiment at 40 GHz.

DESCRIPTION OF REFERENCE NUMERALS

- 1000: ultra-wideband cross-polarized antenna; 2000: ultra-wideband cross-polarized array antenna;
- 3000: ultra-wideband cross-polarized array antenna;
- 100: substrate; 200: first polarized antenna; 300: second polarized antenna; 400: support pad;
- 110: first substrate layer; 120: ground layer; 130: second substrate layer;
- 121: first through hole; 122: second through hole;
- 131: first via; 132: second via; 133: third via; 134: fourth via; 135: metallized hole;
- 201: first branch; 202: second branch; 203: first ground pin; 204: second ground pin; 205: first feed section; 206: second feed section; 207: third feed section; 208: first stub tuner; 209: first pad;
- 210: first feed line; 211: second feed line;
- 301: third branch; 302: fourth branch; 303: third ground pin; 304: fourth ground pin; 305: fourth feed section; 306: fifth feed section; 307: sixth feed section; 308: second stub tuner; 309: third pad;
- 310: third feed line; 311: fourth feed line.

DETAILED DESCRIPTION OF THE INVENTION

More illustrative information regarding various alternative architectures and uses by which the foregoing methods are achievable or unachievable will now be set forth according to user needs. It should be strongly noted that the following information is presented for illustrative purposes and should not be interpreted as limiting in any way. Any of the following features may optionally be combined with or does not exclude other features described.

Figure 1:
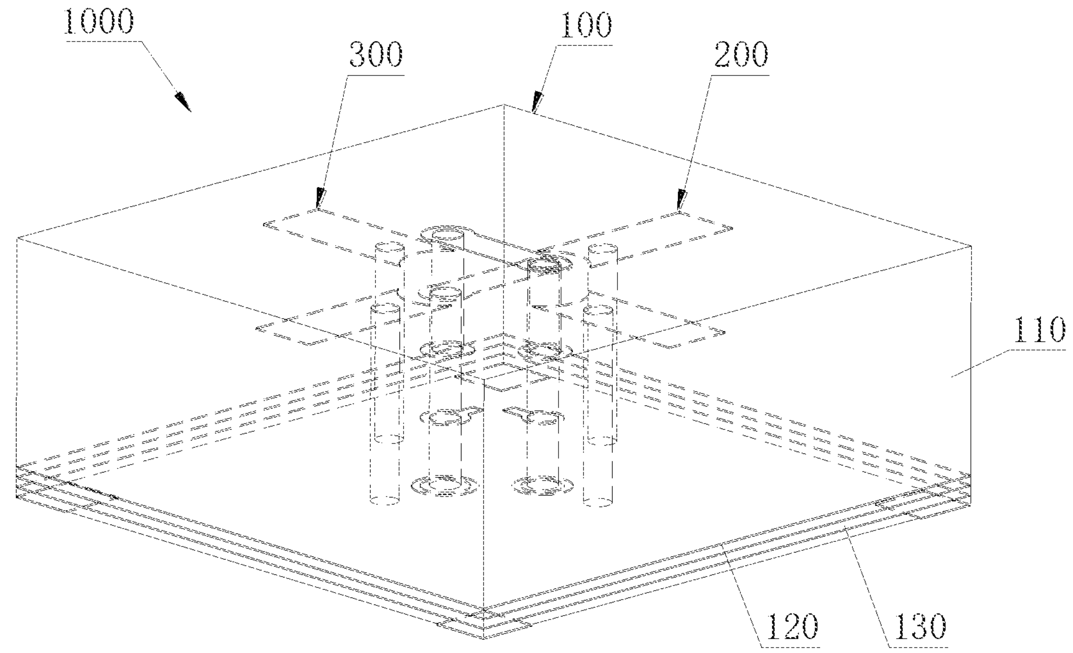
FIG. 1 is a schematic structural diagram of an ultra-wideband cross-polarized antenna according to an embodiment.

FIG. 1 shows an ultra-wideband cross-polarized antenna 1000, as shown in FIG. 1, including a substrate 100, a first polarized antenna 200 and a second polarized antenna 300. The substrate 100 includes a first substrate layer 110, a ground layer 120 and a second substrate layer 130 that are stacked in sequence, and both the first polarized antenna 200 and the second polarized antenna 300 are provided in the substrate 100, with the first polarized antenna 200 orthogonal to the second polarized antenna 300.

Similar to a radio frequency integrated circuit (RFIC) chip, the antenna structure in the embodiment can be welded to a mainboard by providing feed ports and pads at its bottom, and is easy to integrate with a beamformer RFIC on a main PCB, therefore constructing different array antennas for 5G millimeter wave wireless communication device applications.

A structure and composition of the first polarized antenna will be firstly described below.

Figure 2:
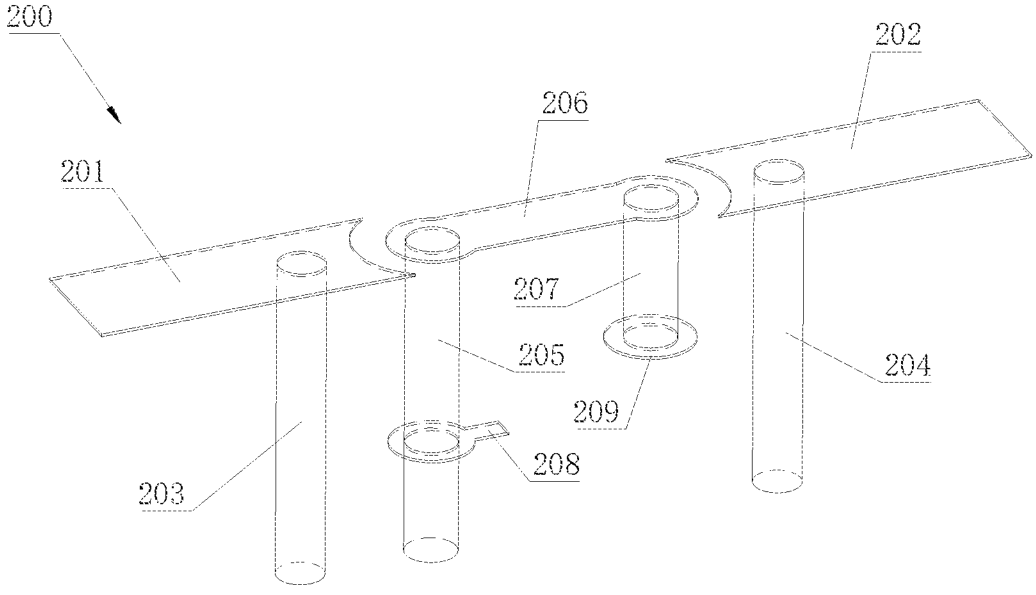
FIG. 2 is a schematic structural diagram of a first polarized antenna according to an embodiment.

FIG. 2 is a schematic structural diagram of the first polarized antenna. As shown in FIG. 1 and FIG. 2, the first polarized antenna 200 includes a first branch 201, a second branch 202, a first ground pin 203, a second ground pin 204 and a first feed structure, with the first branch 201 and the second branch 202 located on the same plane. The first ground pin 203 has one end which is connected to the first branch 201 and the other end which is connected to the ground layer 120, and the second ground pin 204 has one end which is connected to the second branch 202 and has the other end which is connected to the ground layer 120. The first feed structure is located between the first ground pin 203 and the second ground pin 204 for providing coupling for the first branch 201 and the second branch 202.

Specifically, the first feed structure includes a first feed section 205, a second feed section 206 and a third feed section 207 connected in sequence, and the second feed section 206 is parallel to the first branch 201 and the second branch 202 respectively and is vertical to the first feed section 205 and the third feed section 207 respectively, with the third feed section 207 having a smaller length than the first feed section 205. That is, the first feed structure is η-type, one end of the first feed section 205 away from the second feed section 206 is conductive with feed lines provided below the ground layer 120, and one end of the third feed section 207 away from the second feed section 206 is suspended.

Continuing as shown in FIG. 2, the first polarized antenna 200 further includes a first stub tuner 208 which is vertical to the first feed section 205, and the first stub tuner 208 has one end provided on the first feed section 205 and the other end provided toward the third feed section 207. A return loss and bandwidth of the antenna can be improved by changing a length of the first stub tuner 208 and a position of the first stub tuner 208 on the first feed section 205.

Continuing as shown in FIG. 2, the first polarized antenna 200 further includes a first pad 209 which is provided on one end of the third feed section 207 away from the second feed section 206, that is, on the suspended end of the third feed section 207, and the first pad 209 cannot contact the ground layer 120 and the ground pins. In one embodiment, the first pad 209 is circular. The return loss and bandwidth of the antenna can be improved by changing a length of the third feed section 207 and a diameter of the first pad 209.

In one embodiment, the first feed section 205 has the same length as the first ground pin 203 and the second ground pin 204, which is about ¼λ, where λ is a wavelength corresponding to a center frequency of a working frequency band.

In a single polarized antenna, two horizontally placed branches form a balanced electric dipole antenna, and two vertical ground pins and a η-type feed structure in the middle form a magnetic dipole antenna. That is, the single polarized antenna includes the magnetic dipole antenna placed vertically and the balanced electric dipole antenna placed horizontally.

In the η-type feed structure, the first feed section 205 and the third feed section 207 which are vertically oriented provide capacitive coupling, while the horizontally oriented second feed section 206 provides inductive coupling. Both the magnetic dipole antenna and the electric dipole antenna can be excited and tuned by adopting the above feed structure, so that an ultra-wideband antenna can be obtained.

The second polarized antenna 300 basically has the same structure and size as the first polarized antenna 200, and differs in the height of the feed structure from the first polarized antenna 200 to avoid the overlapping of the feed structures of the two polarized antennas. A structure and composition of the second polarized antenna will be described below.

Figure 3:
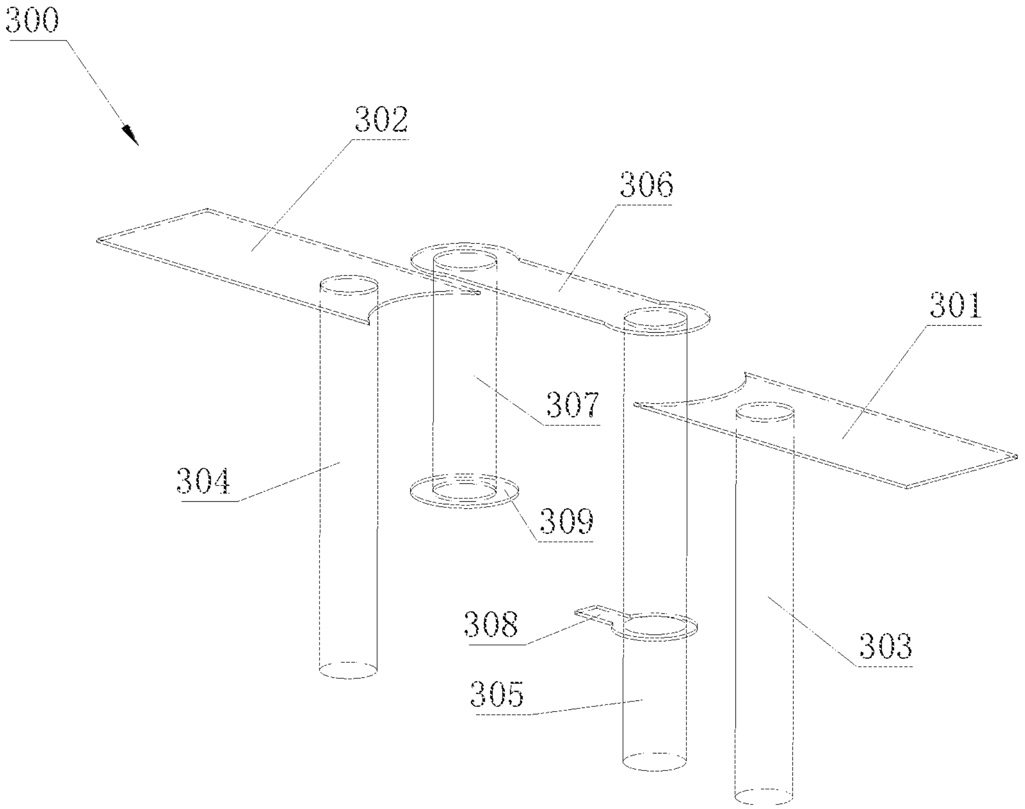
FIG. 3 is a schematic structural diagram of a second polarized antenna according to an embodiment.

FIG. 3 is a schematic structural diagram of the second polarized antenna. As shown in FIG. 1 and FIG. 3, the second polarized antenna 300 includes a third branch 301, a fourth branch 302, a third ground pin 303, and a fourth ground pin 304 and a second feed structure, with the third branch 301 and the fourth branch 302 located on the same plane. The third ground pin 303 has one end which is connected to the third branch 301 and the other end which is connected to the ground layer 120, and the fourth ground pin 304 has one end which is connected to the fourth branch 302 and the other end which is connected to the ground layer 120. The second feed structure is located between the third ground pin 303 and the fourth ground pin 304 for providing coupling for the third branch 301 and the fourth branch 302.

Specifically, the second feed structure includes a fourth feed section 305, a fifth feed section 306 and a sixth feed section 307 connected in sequence, and the fifth feed section 306 is parallel to the third branch 301 and the fourth branch 302 respectively and is vertical to the fourth feed section 305 and the sixth feed section 307 respectively, with the sixth feed section 307 having a smaller length than the fourth feed section 305. That is, the second feed structure is η-type, one end of the fourth feed section 305 away from the fifth feed section 306 is conductive with feed lines provided below the ground layer 120, and one end of the sixth feed section 307 away from the fifth feed section 306 is suspended.

Continuing as shown in FIG. 3, the second polarized antenna 300 further includes a second stub tuner 308 which is vertical to the fourth feed section 305, and the second stub tuner 308 has one end provided on the fourth feed section 305 and the other end provided toward the sixth feed section 307. A return loss and bandwidth of the antenna can be improved by changing a length of the second stub tuner 308 and a position of the second stub tuner 308 on the fourth feed section 305.

Continuing as shown in FIG. 3, the second polarized antenna 300 further includes a second pad 309 which is provided on one end of the sixth feed section 307 away from the fifth feed section 306, that is, on the suspended end of the sixth feed section 307. In one embodiment, the second pad 309 is circular. The return loss and bandwidth of the antenna can be improved by changing a length of the sixth feed section 307 and a diameter of the second pad 309.

In an optional embodiment, the fourth feed section 305 may have a larger length than the first feed section 205, or may also have a smaller length than the first feed section 205, so that the second feed section 206 and the fifth feed section 306 are located on different planes so as to avoid the overlapping of the second feed section 206 and the fifth feed section 306, thereby avoiding the overlapping of the first feed structure of the first polarized antenna 200 and the second feed structure of the second polarized antenna 300.

In the embodiment, the fourth feed section 305 has a larger length than the first feed section 205 with the length difference of 100 μm.

In the embodiment, the first branch 201 and the second branch 202 have the same length direction as the second feed section 206, and the third branch 301 has the same length direction as the fourth branch 302, with the length direction of the first branch 201 and the second branch 202 vertical to that of the third branch 301 and the fourth branch 302. The second feed section 206, the first branch 201, the second branch 202, the third branch 301 and the fourth branch 302 are located on the same plane, and projections of the second feed section 206 and the fifth feed section 306 on the ground layer 120 are vertical to each other. The first stub tuner 208 and the second stub tuner 308 have the same length and are located on the same plane; and the first pad 209 and the second pad 309 have the same shape and size and are located on the same plane.

Figure 4:
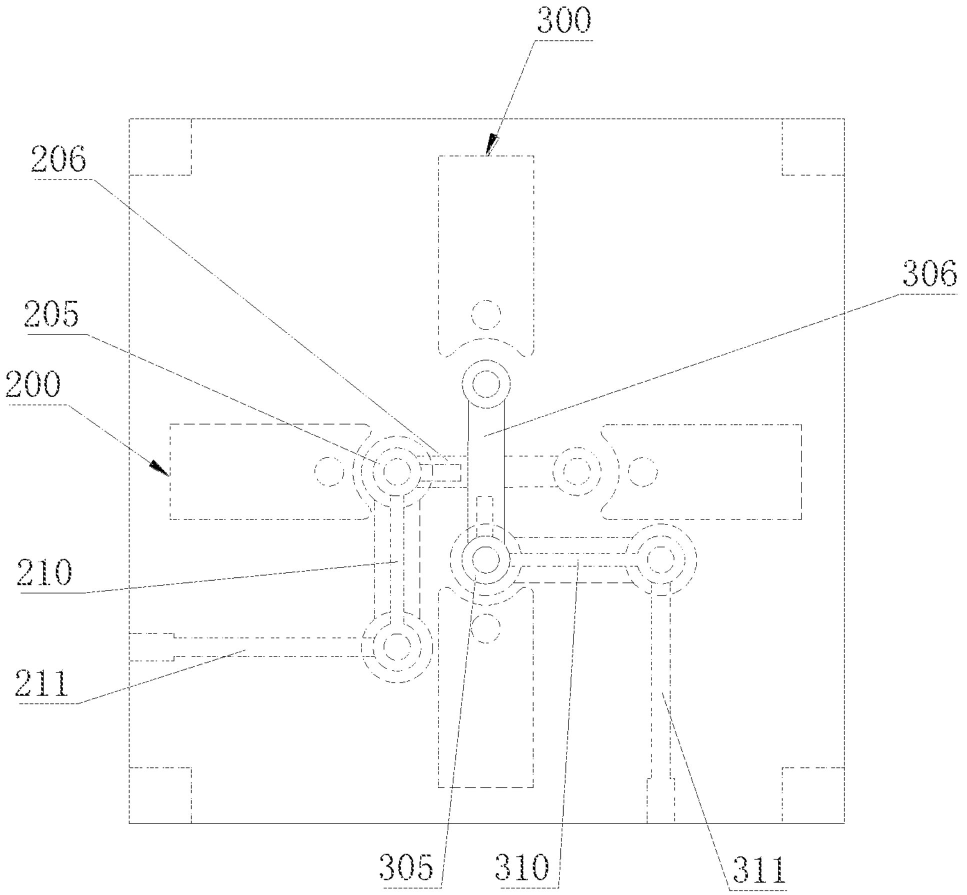
FIG. 4 is a schematic top view of FIG. 1.
Figure 5:
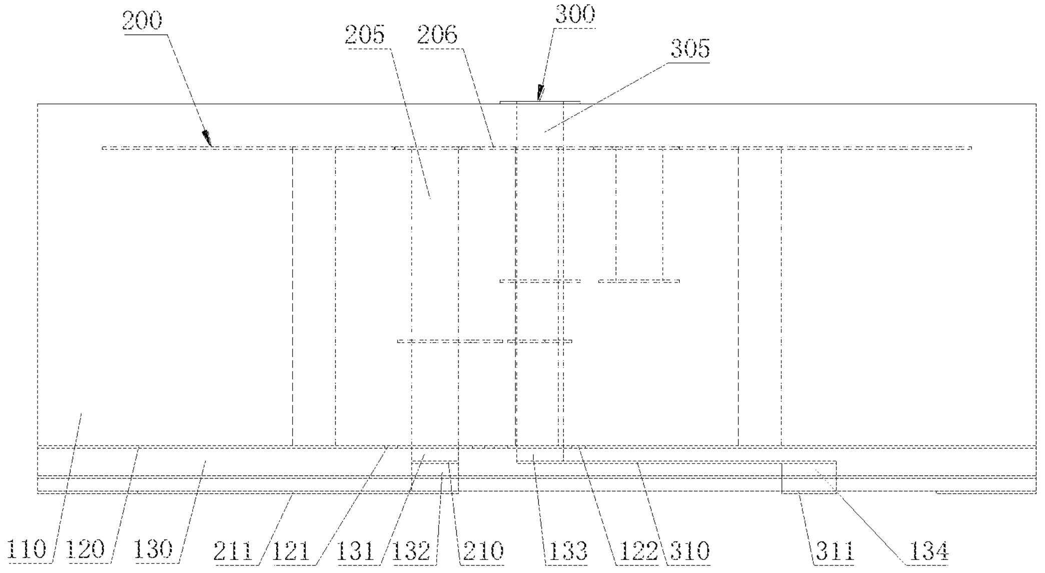
FIG. 5 is a schematic side view of FIG. 1.

FIG. 4 is a schematic top view of an ultra-wideband cross-polarized antenna, and FIG. 5 is a schematic side view of an ultra-wideband cross-polarized antenna. As shown in FIGS. 4 and 5, the first polarized antenna 200 further includes a first feed line 210 provided in the second substrate layer 130, and a second feed line 211 provided on one side of the second substrate layer 130 away from the ground layer 120. The first feed line 210 has one end which is conductive with one end of the first feed section 205 away from the second feed section 206, and the other end which is conductive with the second feed line 211. The second polarized antenna 300 further includes a third feed line 310 provided in the second substrate layer 130, and a fourth feed line 311 provided on one side of the second substrate layer 130 away from the ground layer 120. The third feed line 310 has one end which is conductive with one end of the fourth feed section 305 away from the fifth feed section 306, and the other end which is conductive with the fourth feed line 311. In the embodiment, the first feed line 210, the second feed line 211, the third feed line 310 and the fourth feed line 311 have an impedance of 50Ω.

In some embodiments, the substrate may be composed of metal layers and dielectric layers of a multilayer PCB. In an optional embodiment, the first substrate layer may include four metal layers stacked in sequence, namely, a first metal layer, a second metal layer, a third metal layer, and a fourth metal layer in sequence from top to bottom, with the ground layer taken as a fifth metal layer; and the second substrate layer may include three metal layers stacked in sequence, namely, a sixth metal layer, a seventh metal layer and a eighth metal layer in sequence from top to bottom, with a dielectric layer provided between every two adjacent metal layers. That is, the substrate can be composed of eight metal layers and seven dielectric layers, with the metal layers and the dielectric layers alternately stacked. Strip-line structures are formed between the ground layer (the fifth metal layer), the sixth metal layer and the seventh metal layer.

Herein, the fifth feed section of the second polarized antenna is formed on the first metal layer; the first branch, the second branch and the second feed section of the first polarized antenna, and the third and fourth branches of the second polarized antenna are formed on the second metal layer; the first pad of the first polarized antenna and the second pad of the second polarized antenna are formed on the third metal layer; the first stub tuner of the first polarized antenna and the second stub tuner of the second polarized antenna are formed on the fourth metal layer; the first feed line of the first polarized antenna and the third feed line of the second polarized antenna are formed on the sixth metal layer; and the second feed line of the first polarized antenna and the fourth feed line of the second polarized antenna are formed on the eighth metal layer.

Moreover, the first ground pin, the second ground pin, the first feed section and the third feed section of the first polarized antenna, and the third ground pin, the fourth ground pin, the fourth feed section and the sixth feed section of the second polarized antenna, may be composed of vias (metallized holes) provided in the first substrate layer.

Similarly, the conduction between the first feed section, the first feed line and the second feed line, and the conduction between the fourth feed section, the third feed line and the fourth feed line, can also be realized by vias provided in the second substrate layer.

Specifically, in the embodiment, as shown in FIGS. 4-5, a first through hole 121 and a second through hole 122 are respectively provided in the ground layer 120 at positions corresponding to the first feed section 205 and the fourth feed section 305. In the second substrate layer 130, a first via 131 and a second via 132 are respectively provided at positions corresponding to both ends of the first feed line 210, and a third via 133 and a fourth via 134 are respectively provided at positions corresponding to both ends of the third feed line 310, with the first via 131 and the third via 133 provided between the ground layer 120 (the fifth metal layer) and the sixth metal layer, and with the second via 132 and the fourth via 134 provided between the sixth metal layer and the eighth metal layer.

One end of the first feed section 205 away from the second feed section 206 passes through the first through hole 121 and is connected to one end of the first feed line 210 through the first via 131, and the other end of the first feed line 210 is connected to one end of the second feed line 211 through the second via 132. One end of the fourth feed section 305 away from the fifth feed section 306 passes through the second through hole 122 and is connected to one end of the third feed line 310 through the third via 133, and the other end of the third feed line 310 is connected to one end of the fourth feed line 311 through the fourth via 134.

Herein, the first through hole 121 has a larger transverse cross-sectional area than the first feed section 205, and the second through hole 122 has a larger transverse cross-sectional area than the fourth feed section 305, so as to avoid the grounding of the feed structures.

In an optional embodiment, a plurality of metallized holes 135 are further provided in the second substrate layer 130 (specifically provided between the ground layer, the sixth metal layer and the seventh metal layer) and the metallized holes 135 are provided around the first feed line 210 and the third feed line 310 for shielding interferences between the feed lines. In an optional embodiment, the plurality of metallized holes 135 provided in the second substrate layer 130 are also provided around a single cross-polarized antenna, that is, the plurality of metallized holes 135 are distributed on edges of the second substrate layer 130 of the single cross-polarized antenna, so as to shield interferences between different cross-polarized antennas when a plurality of cross-polarized antennas are integrated into an array antenna.

Figure 6:
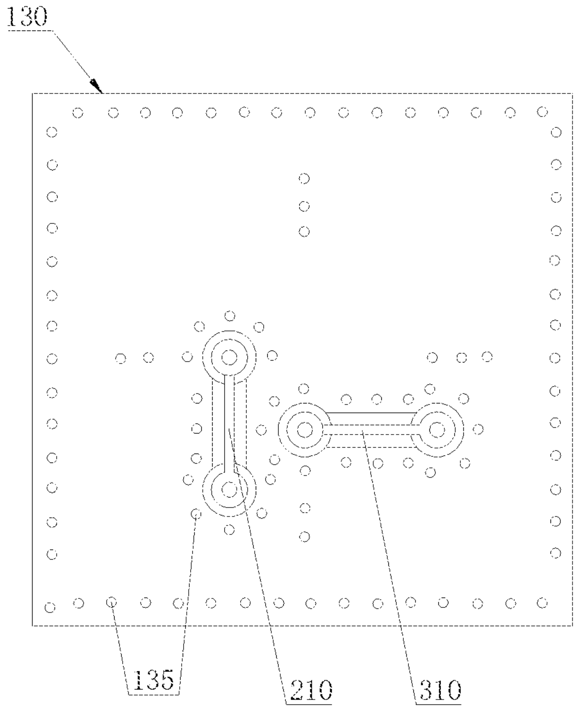
FIG. 6 shows a schematic cross-sectional view of a side where a first feed line and a third feed line are located, in the second substrate layer according to a possible embodiment.

For example, FIG. 6 shows a schematic cross-sectional view of a side where the first feed line and the third feed line are located, in the second substrate layer provided with a plurality of metallized holes. As shown in FIG. 6, some metallized holes 135 are provided around the first feed line 210 and the third feed line 310, and other metallized holes 135 are distributed on the edges of the second substrate layer 130.

Figure 7:
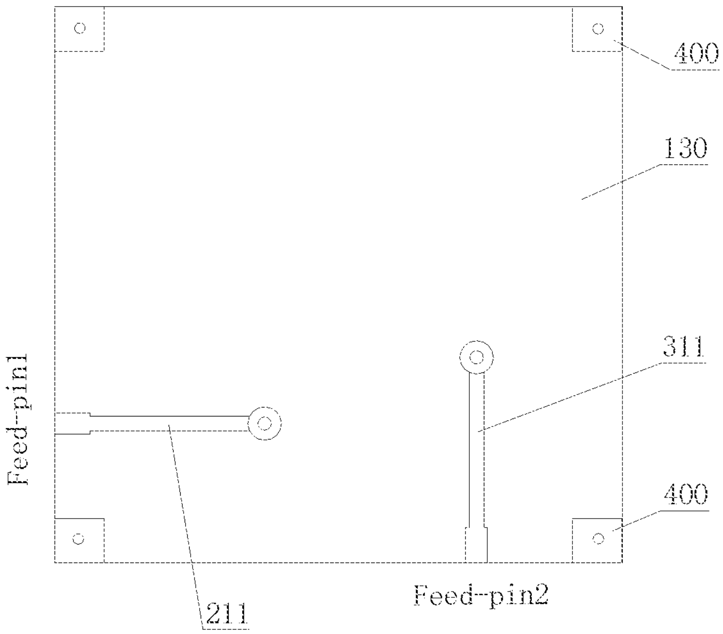
FIG. 7 is a schematic bottom view of FIG. 1.

FIG. 7 is a schematic bottom view of an ultra-wideband cross-polarized antenna. As shown in FIG. 7, the other end of the second feed line 211 extends to an edge of the second substrate layer 130 so as to be connected to a first cross-polarized port Feed-pin1, and the other end of the fourth feed line 311 extends to another edge of the second substrate layer 130 so as to be connected to a second cross-polarized port Feed-pin2.

In some embodiments, the ultra-wideband cross-polarized antenna further includes at least one support pad 400 provided on the side of the second substrate layer 130 away from the ground layer 120, namely, on the eighth metal layer. In the embodiment, as shown in FIG. 7, four support pads 400 are included, and the four support pads 400 are respectively located at four corners of the side of the second substrate layer 130 away from the ground layer. In some embodiments, each support pad 400 is further connected to the ground layer (the fifth metal layer), the sixth metal layer, the seventh metal layer and the eighth metal layer respectively, through the metallized holes in the second substrate layer.

With the above structures, the ultra-wideband cross-polarized antenna can be welded on a top layer of the main PCB and be integrated with the beamformer RFIC, therefore constructing array antennas of different sizes for 5G millimeter wave wireless devices.

Figure 8:
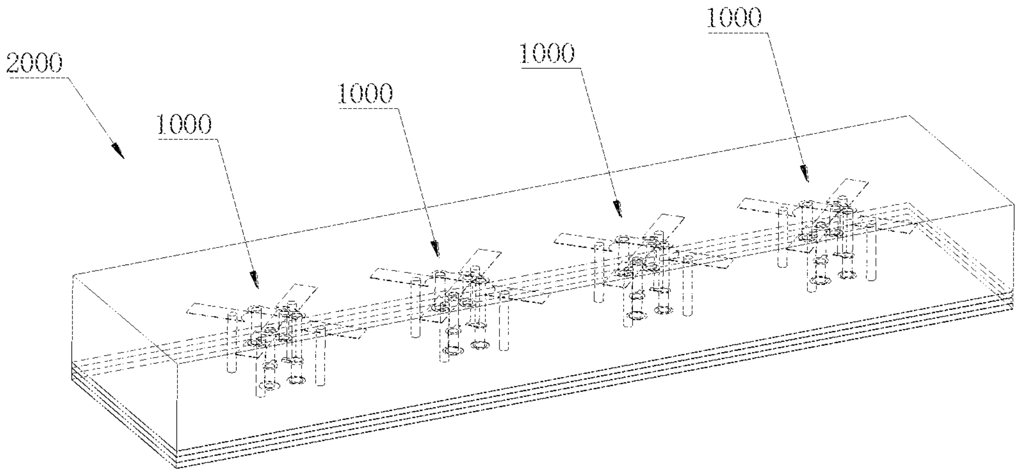
FIG. 8 shows a 1×4 ultra-wideband cross-polarized array antenna for smart mobile terminals and other small wireless devices according to a possible embodiment.
Figure 9:
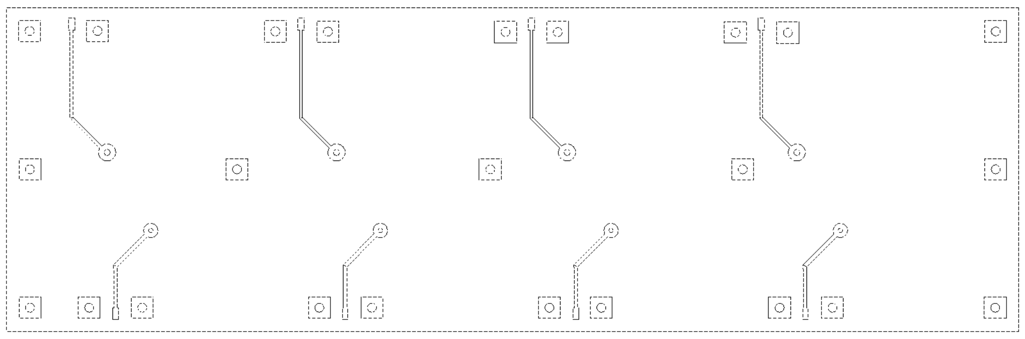
FIG. 9 is a schematic bottom view of FIG. 8.

FIG. 8 shows a 1×4 ultra-wideband cross-polarized array antenna 2000 (with polarization direction of ±45°) for smart mobile terminals (such as mobile phones) and other small wireless devices, and FIG. 9 is a schematic bottom view of the ultra-wideband cross-polarized array antenna 2000 of FIG. 8, which includes four linearly arranged ultra-wideband cross-polarized antennas 1000. The ultra-wideband cross-polarized array antenna is welded on the top layer of the main PCB. In an optional embodiment, the beamformer RFIC can be mounted on the top or bottom layer of the main PCB.

Figure 10:
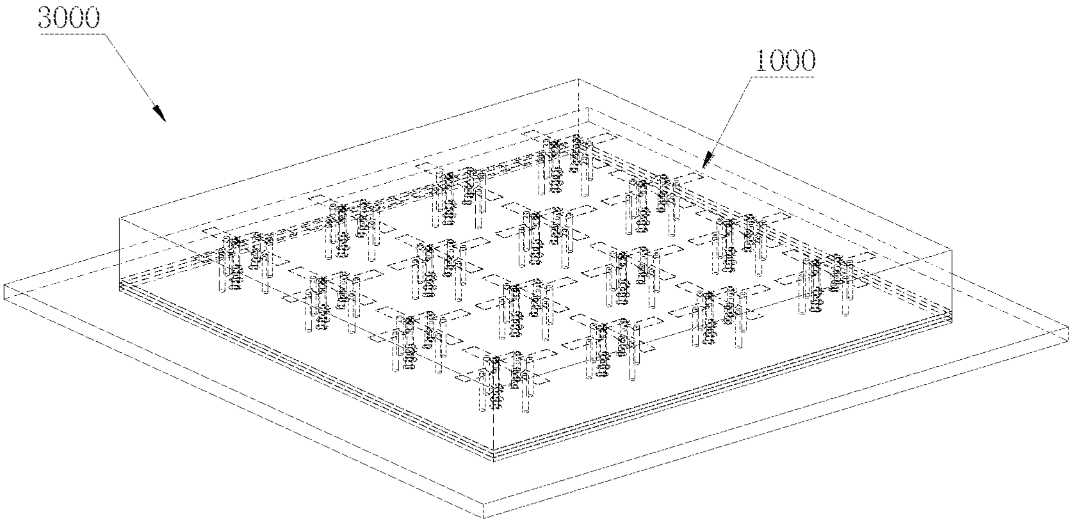
FIG. 10 shows a 4×4 ultra-wideband cross-polarized array antenna for outdoor CPE according to a possible embodiment.

FIG. 10 shows a 4×4 ultra-wideband cross-polarized array antenna 3000 for outdoor CPE (Customer Premises Equipment), which includes 16 array-distributed ultra-wideband cross-polarized antennas 1000. The ultra-wideband cross-polarized array antenna is provided on the top layer of the main PCB, and in an optional embodiment, the beamformer RFIC is mounted on a bottom layer of a multilayer PCB, like an AiP (Antenna-in-Package).

In an optional embodiment, the 4×4 ultra-wideband cross-polarized array antenna 3000 measures 27.4 mm by 27.4 mm by 2.39 mm, which, at this time, can cover a low frequency band of 5G millimeter wave applications. In another optional embodiment, the 4×4 ultra-wideband cross-polarized array antenna 3000 measures 20.4 mm by 20.4 mm by 1.59 mm, which, at this time, can cover a high frequency band of 5G millimeter wave applications.

Figure 11:
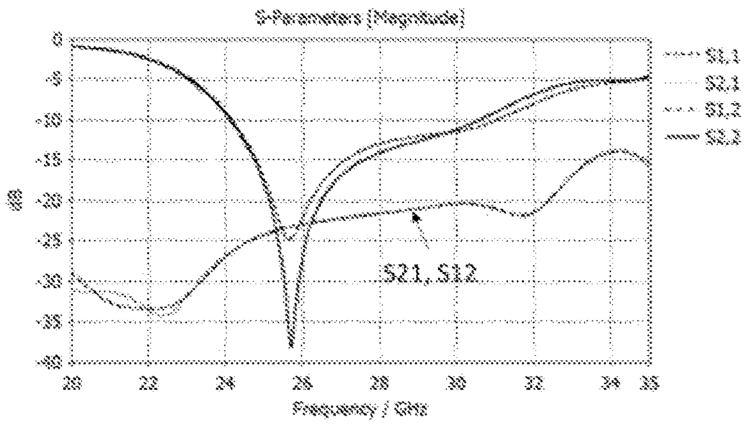
FIG. 11 shows a schematic diagram of S-parameters of an ultra-wideband cross-polarized antenna according to a possible embodiment, with the ultra-wideband cross-polarized antenna for covering a low frequency band of 5G millimeter wave applications.
Figure 12:
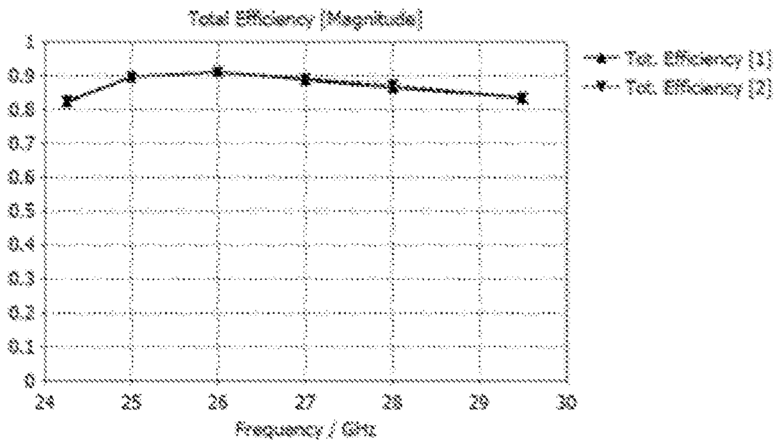
FIG. 12 shows a schematic diagram of an overall efficiency of an ultra-wideband cross-polarized antenna according to a possible embodiment, with the ultra-wideband cross-polarized antenna for covering a low frequency band of 5G millimeter wave applications.
Figure 13:
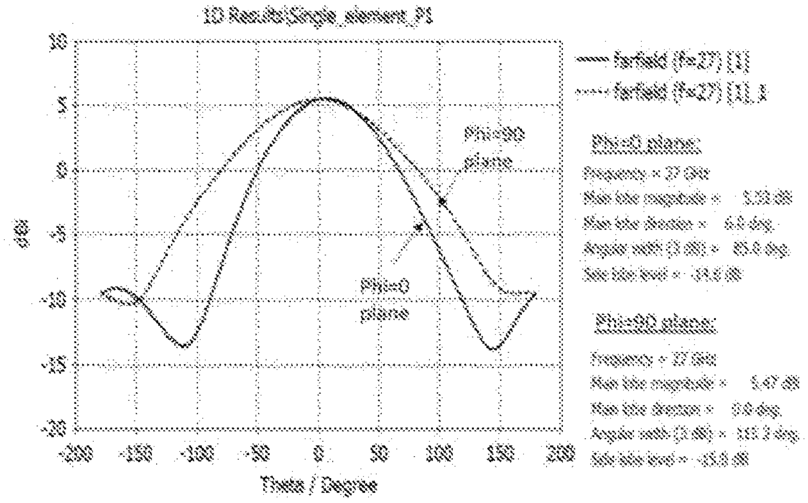
FIG. 13 shows a 2D radiation pattern of a first cross-polarized port of an ultra-wideband cross-polarized antenna according to a possible embodiment at 27 GHz, with the ultra-wideband cross-polarized antenna for covering a low frequency band of 5G millimeter wave applications.
Figure 14:
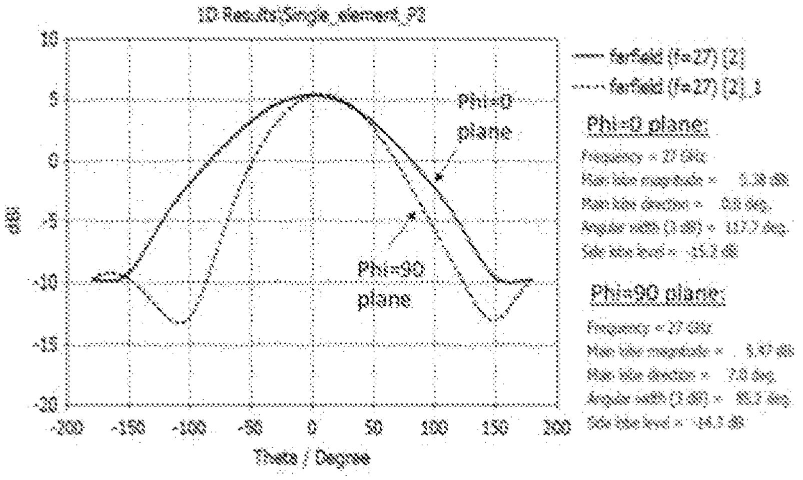
FIG. 14 shows a 2D radiation pattern of a second cross-polarized port of the ultra-wideband cross-polarized antenna according to a possible embodiment at 27 GHz, with the ultra-wideband cross-polarized antenna for covering a low frequency band of 5G millimeter wave applications.

In one embodiment, the ultra-wideband cross-polarized antenna measures 5 mm by 5 mm by 2.22 mm, which, in the embodiment, is used to cover the low frequency band (24.25-29.5 GHz) of 5G millimeter wave applications. FIG. 11 shows a schematic diagram of S-parameters of the ultra-wideband cross-polarized antenna in the embodiment, FIG. 12 shows a schematic diagram of an overall efficiency of the ultra-wideband cross-polarized antenna in the embodiment, and FIGS. 13-14 show radiation patterns of the two cross-polarized ports of the ultra-wideband cross-polarized antenna in the embodiment at 27 GHz. As shown in FIGS. 11-14, the ultra-wideband cross-polarized antenna in the embodiment covers a full low frequency band of 24.25-29.5 GHz for 5G millimeter wave applications. An isolation between the two cross-polarized ports is better than 21 dB, and the overall efficiency is better than 80%. In two elevation planes (Phi=0 and Phi=90), HPBWs (half-power beam widths) of the ultra-wideband cross-polarized antenna are respectively 85°/115.2° and 117.7°/85.2° at 27 GHz.

Figure 15:
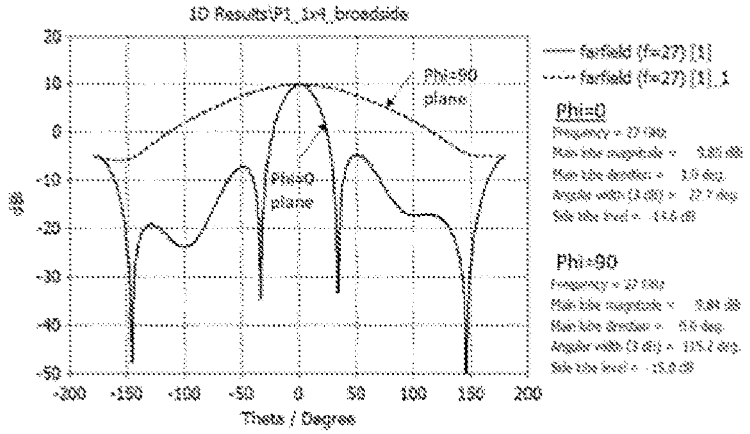
FIG. 15 shows a 2D radiation pattern of a first cross-polarized port of a 1×4 ultra-wideband cross-polarized array antenna according to a possible embodiment at 27 GHz.
Figure 16:
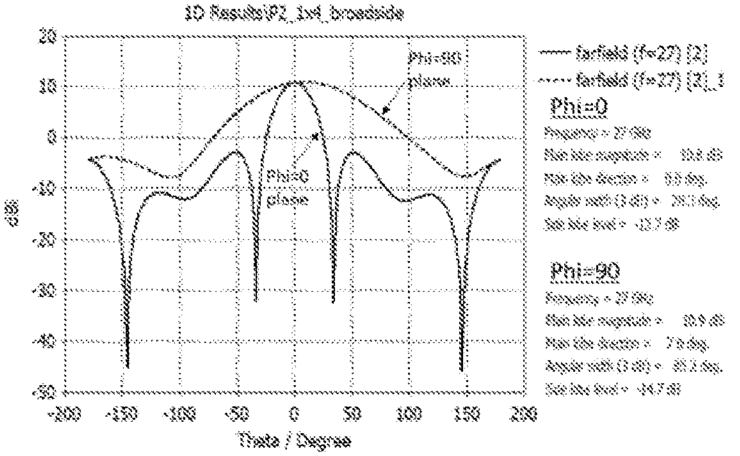
FIG. 16 shows a 2D radiation pattern of a second cross-polarized port of a 1×4 ultra-wideband cross-polarized array antenna according to a possible embodiment at 27 GHz.
Figure 17:
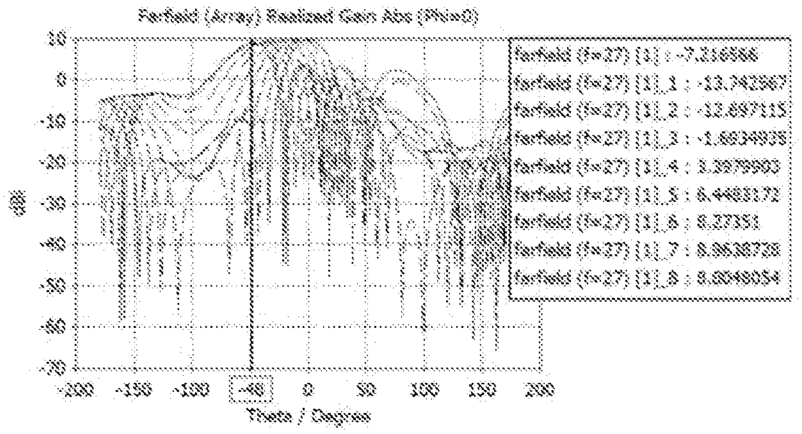
FIG. 17 shows a schematic diagram of maximum beam scanning range of a first cross-polarized port of a 1×4 ultra-wideband cross-polarized array antenna according to a possible embodiment at 27 GHz.
Figure 18:
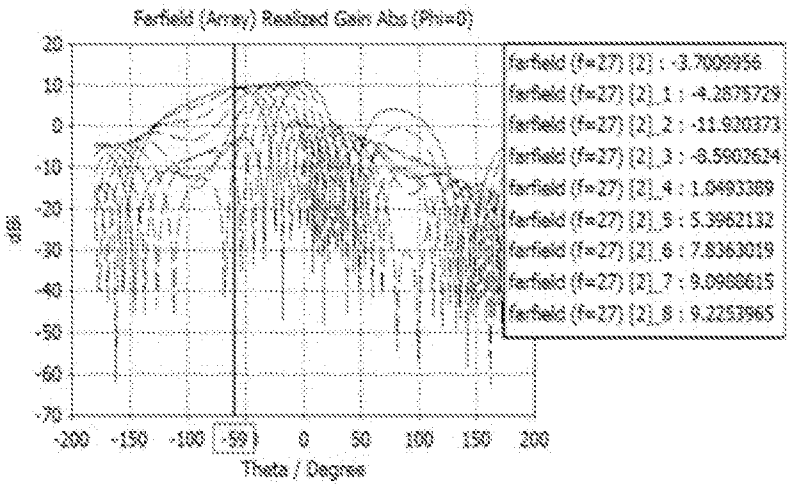
FIG. 18 shows a schematic diagram of maximum beam scanning range of a second cross-polarized port of a 1×4 ultra-wideband cross-polarized array antenna according to a possible embodiment at 27 GHz.

In one embodiment, a 1×4 ultra-wideband cross-polarized array antenna is formed by the above ultra-wideband cross-polarized antennas for covering the low frequency band of 5G millimeter wave applications. FIGS. 15 and 16 respectively show radiation patterns of the two cross-polarized ports of the 1×4 ultra-wideband cross-polarized array antenna at 27 GHz, and FIGS. 17 and 18 respectively show schematic diagrams of maximum beam scanning ranges of the two cross-polarized ports of the 1×4 ultra-wideband cross-polarized array antenna at 27 GHz. As shown in FIGS. 15-18, the first cross-polarized port of the 1×4 ultra-wideband cross-polarized array antenna has a peak realized gain of +9.85 dBi in the broadside case of 27 GHz, and the second cross-polarized port of the 1×4 ultra-wideband cross-polarized array antenna has a peak realized gain of +10.8 dBi in the broadside case of 27 GHz. In the broadside case of 27 GHz, in the two elevation planes (Phi=0 and Phi=90), the 1×4 ultra-wideband cross-polarized array antenna has the HPBWs of 27.7°/115.2° and 28.3°/85.2°, respectively for the first cross-polarized port and for the second cross-polarized port. When the first cross-polarized port is at 27 GHz, the 1×4 ultra-wideband cross-polarized array antenna has a maximum beam scanning range of 96° (−48° to +48°); and when the second cross-polarized port is at 27 GHz, the 1×4 ultra-wideband cross-polarized array antenna has a maximum beam scanning range of 118° (−59° to +59°). Within the scanning ranges, the first cross-polarized port has a peak gain variation of less than 0.83 dB, and the second cross-polarized port has a peak gain variation of less than 1.47 dB.

In another embodiment, the ultra-wideband cross-polarized antenna measures 4 mm by 4 mm by 1.533 mm, which, in the embodiment, is used to cover the high frequency band (37-52.6 GHz) of 5G millimeter wave applications. The ultra-wideband cross-polarized antenna for covering the high frequency band of 5G millimeter wave applications has the completely same structural principles as but different sizes from that for covering the low frequency band of 5G millimeter wave applications. For example, for the two types of antennas, their corresponding stub tuners have different positions and lengths, and the corresponding shorter feed sections vertically arranged (i.e., their corresponding third and sixth feed sections) of their corresponding feed structures have different lengths, etc.

FIG. 19 shows a schematic diagram of S-parameters of the ultra-wideband cross-polarized antenna in the embodiment, FIG. 20 shows a schematic diagram of an overall efficiency of the ultra-wideband cross-polarized antenna in the embodiment, and FIGS. 21-22 show radiation patterns of the two cross-polarized ports of the ultra-wideband cross-polarized antenna in the embodiment at 40 GHz. As shown in FIGS. 19-20, the ultra-wideband cross-polarized antenna in the embodiment covers a full high frequency band of 37-52.6 GHz for 5G millimeter wave applications, the return loss is better than −10 dB in the frequency band of 37-52 GHz, and in the most important frequency band (37-43.5 GHz), the isolation between the two cross-polarized ports is better than 17 dB and the overall efficiency is better than 80%. As shown in FIGS. 21-22, the ultra-wideband cross-polarized antenna in the embodiment has a peak gain of about +5.6 dBi at 40 GHz, and in the two elevation planes (Phi=0 and Phi=90), the two cross-polarized ports have respectively the HPBWs (half-power beam widths) of 79.6°/110° and 112.8°/80°.

In one embodiment, a 1×4 ultra-wideband cross-polarized array antenna is formed by the above ultra-wideband cross-polarized antennas for covering the high frequency band of 5G millimeter wave applications, and FIGS. 23 and 24 respectively show radiation patterns of the two cross-polarized ports of the 1×4 ultra-wideband cross-polarized array antenna at 40 GHz. As shown in FIGS. 23-24, the first cross-polarized port of the 1×4 ultra-wideband cross-polarized array antenna has a peak realized gain of +10.5 dBi in the broadside case of 40 GHz, and the second cross-polarized port of the 1×4 ultra-wideband cross-polarized array antenna has a peak realized gain of +11.7 dBi in the broadside case of 40 GHz. In the broadside case of 40 GHz, in the two elevation planes (Phi=0 and Phi=90), the 1×4 ultra-wideband cross-polarized array antenna has the HPBWs of 23.5°/110° and 24.0°/80.1°, respectively for the first cross-polarized port and for the second cross-polarized port.

FIGS. 25 and 26 respectively show schematic diagrams of maximum beam scanning ranges of the two cross-polarized ports of the 1×4 ultra-wideband cross-polarized array antenna at 40 GHz. As shown in FIGS. 25-26, when the first cross-polarized port is at 40 GHz, the 1×4 ultra-wideband cross-polarized array antenna has a maximum beam scanning range of 82° (−41° to +41°); and when the second cross-polarized port is at 40 GHz, the 1×4 ultra-wideband cross-polarized array antenna has a maximum beam scanning range of 98° (−49° to +49°). The first cross-polarized port has a peak gain variation of less than 1.5 dB, and the second cross-polarized port has a peak gain variation of less than 2.3 dB.

To sum up, the ultra-wideband cross-polarized antennas of one or more of the above embodiments have the following advantages over most popular patch array antennas: simple structure without the need for aperture coupling and parasitic elements; ultra-wide bandwidth with the capability of covering 5G millimeter wave full frequency band, i.e., the low frequency band of 24.25-29.5 GHz and the high frequency band of 37-52.6 GHz; good return loss in the working frequency band (better than −10 dB), good isolation between the two cross-polarized ports, high efficiency (better than 80% for all frequency bands), and a single cross-polarized antenna's wider HPBW (half-power beam width) than most patch antenna elements; the easiness to be integrated with the beamformer RFIC on the main PCB; and a wider beam scanning range of the array antenna constructed by the ultra-wideband cross-polarized antenna in the above embodiments than most patch array antennas.

What is described above is only the embodiments of the present invention, and is not intended to limit the patent scope of the present invention. Any equivalent variations made by using the contents of the specification and drawings of the present invention, which are directly or indirectly applied in related technical fields, are similarly included within the patent protection scope of the present invention.

The use of the terms "a", "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated therein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any or all examples, or exemplary languages (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions are bright about that result. No language in the specification should be construed as indicating any non-claimed element as essential to the practice of the invention as claimed.

The embodiments described therein included the one or more modes known to the inventor for carrying out the claimed subject matter. Of course, variations of those embodiments will become apparent to those of ordinary skilled in the art upon reading the foregoing description. The inventor expects skilled artisans to employ such variations as appropriate, and the inventor intends for the claimed subject matter to be practiced otherwise than as specifically described therein. Accordingly, this claimed subject matter includes all modifications and equivalents of the subject matter recited in the claims appended hereinto as permitted by applicable law. Moreover, any combination of the above-described elements in all possible variations thereof is encompassed unless otherwise indicated therein or otherwise clearly contradicted by context.

The invention claimed is:

1. An ultra-wideband cross-polarized antenna, comprising:

a substrate including a first substrate layer and a ground layer that are stacked in sequence;

a first polarized antenna provided in the first substrate layer; and a second polarized antenna provided in the first substrate layer and orthogonal to the first polarized antenna;

wherein, the first polarized antenna includes:

a first branch;

a second branch located on the same plane as the first branch;

a first ground pin of which one end is connected to the first branch and of which other end is connected to the ground layer;

a second ground pin of which one end is connected to the second branch and of which other end is connected to the ground layer; and a first feed structure coupled with the first branch and the second branch; and wherein, the second polarized antenna includes:

a third branch;

a fourth branch located on the same plane as the third branch;

a third ground pin of which one end is connected to the third branch and of which other end is connected to the ground layer;

a fourth ground pin of which one end is connected to the fourth branch and of which other end is connected to the ground layer; and a second feed structure coupled with the third branch and the fourth branch.

2. The ultra-wideband cross-polarized antenna according to claim 1, characterized in that the first feed structure includes a first feed section, a second feed section and a third feed section connected in sequence, and the second feed section is parallel to the first branch and the second branch and is respectively vertical to the first feed section and the third feed section, with the third feed section having a smaller length than the first feed section; and the second feed structure includes a fourth feed section, a fifth feed section and a sixth feed section connected in sequence, and the fifth feed section is parallel to the third branch and the fourth branch and is respectively vertical to the fourth feed section and the sixth feed section, with the sixth feed section having a smaller length than the fourth feed section.

3. The ultra-wideband cross-polarized antenna according to claim 2, characterized in that the fourth feed section has a larger or smaller length than the first feed section.

4. The ultra-wideband cross-polarized antenna according to claim 3, characterized in that the first feed section has a length of $\frac{1}{4}\lambda$, where $\lambda$ is a wavelength corresponding to a center frequency of a working frequency band; and the first feed section differs in length from the fourth feed section by 100 μm.

5. The ultra-wideband cross-polarized antenna according to claim 2, characterized in that the first polarized antenna further includes a first stub tuner which is vertical to the first feed section, and the first stub tuner has one end provided on the first feed section and the other end provided toward the third feed section; and the second polarized antenna further includes a second stub tuner which is vertical to the fourth feed section, and the second stub tuner has one end provided on the fourth feed section and the other end provided toward the sixth feed section.

6. The ultra-wideband cross-polarized antenna according to claim 2, characterized in that the first polarized antenna further includes a first pad which is provided on one end of the third feed section away from the second feed section; and the second polarized antenna further includes a second pad which is provided on one end of the sixth feed section away from the fifth feed section.

7. The ultra-wideband cross-polarized antenna according to claim 6, characterized in that the first pad and the second pad are circular.

8. The ultra-wideband cross-polarized antenna according to claim 2, characterized in that the first substrate layer is composed of a multiplayer PCB; and the first ground pin, the second ground pin, the first feed section, the third feed section, the third ground pin, the fourth ground pin, the fourth feed section and the sixth feed section are vias provided in the first substrate layer.

9. The ultra-wideband cross-polarized antenna according to claim 2, characterized in that the substrate further includes a second substrate layer stacked on one side of the ground layer away from the first substrate layer;

the first polarized antenna further includes:

a first feed line which is provided in the second substrate layer, with one end of the first feed section away from the second feed section conductive with one end of the first feed line; and a second feed line which is provided on one side of the second substrate layer away from the ground layer and which is conductive with the other end of the first feed line; and the second polarized antenna further includes:

a third feed line which is provided in the second substrate layer, with one end of the fourth feed section away from the fifth feed section conductive with one end of the third feed line; and a fourth feed line which is provided on the side of the second substrate layer away from the ground layer and which is conductive with the other end of the third feed line.

10. The ultra-wideband cross-polarized antenna according to claim 9, characterized in that a first through hole and a second through hole are respectively provided in the ground layer at positions corresponding to the first feed section and the fourth feed section;

in the second substrate layer, a first via and a second via are respectively provided at positions corresponding to both ends of the first feed line, and a third via and a fourth via are respectively provided at positions corresponding to both ends of the third feed line;

one end of the first feed section away from the second feed section passes through the first through hole and is connected to one end of the first feed line through the first via, and the other end of the first feed line is connected to one end of the second feed line through the second via; and one end of the fourth feed section away from the fifth feed section passes through the second through hole and is connected to one end of the third feed line through the third via, and the other end of the third feed line is connected to one end of the fourth feed line through the fourth via.

11. The ultra-wideband cross-polarized antenna according to claim 10, characterized in that the first through hole has a larger transverse cross-sectional area than the first feed section, and the second through hole has a larger transverse cross-sectional area than the fourth feed section.

12. The ultra-wideband cross-polarized antenna according to claim 9, characterized in that the second substrate layer is composed of a multilayer PCB, the first feed line and the third feed line are strip-lines, and the first feed line, the second feed line, the third feed line and the fourth feed line have an impedance of 50Ω.

13. The ultra-wideband cross-polarized antenna according to claim 9, characterized in that the ultra-wideband cross-polarized antenna further includes at least one support pad provided on one side of the second substrate layer away from the ground layer.

14. The ultra-wideband cross-polarized antenna according to claim 13, characterized in that there are four support pads which are respectively located at four corners of the side of the second substrate layer away from the ground layer.

15. The ultra-wideband cross-polarized antenna according to claim 1, characterized in that it measures 5 mm by 5 mm by 2.22 mm or 4 mm by 4 mm by 1.533 mm.

16. An ultra-wideband cross-polarized array antenna, comprising a plurality of the ultra-wideband cross-polarized antennas according to claim 1, which are linearly distributed or array-distributed and of which substrates are integrally formed.

17. The ultra-wideband cross-polarized array antenna according to claim 16, characterized in that the first feed structure in the ultra-wideband cross-polarized antenna includes a first feed section, a second feed section and a third feed section connected in sequence, and the second feed section is parallel to the first branch and the second branch and is respectively vertical to the first feed section and the third feed section, with the third feed section having a smaller length than the first feed section; and the second feed structure in the ultra-wideband cross-polarized antenna includes a fourth feed section, a fifth feed section and a sixth feed section connected in sequence, and the fifth feed section is parallel to the third branch and the fourth branch and is respectively vertical to the fourth feed section and the sixth feed section, with the sixth feed section having a smaller length than the fourth feed section.

18. The ultra-wideband cross-polarized array antenna according to claim 17, characterized in that the first polarized antenna in the ultra-wideband cross-polarized antenna further includes:

a first stub tuner which is vertical to the first feed section, and the first stub tuner has one end provided on the first feed section and the other end provided toward the third feed section; and a first pad which is provided on one end of the third feed section away from the second feed section; and the second polarized antenna in the ultra-wideband cross-polarized antenna further includes:

a second stub tuner which is vertical to the fourth feed section, and the second stub tuner has one end provided on the fourth feed section and the other end provided toward the sixth feed section; and a second pad which is provided on one end of the sixth feed section away from the fifth feed section.

19. The ultra-wideband cross-polarized array antenna according to claim 17, characterized in that the substrate further includes a second substrate layer stacked on one side of the ground layer away from the first substrate layer;

the first polarized antenna further includes:

a first feed line which is provided in the second substrate layer, with one end of the first feed section away from the second feed section conductive with one end of the first feed line; and a second feed line which is provided on one side of the second substrate layer away from the ground layer and which is conductive with the other end of the first feed line; and the second polarized antenna further includes:

a third feed line which is provided in the second substrate layer, with one end of the fourth feed section away from the fifth feed section conductive with one end of the third feed line; and a fourth feed line which is provided on the side of the second substrate layer away from the ground layer and which is conductive with the other end of the third feed line.

20. The ultra-wideband cross-polarized array antenna according to claim 19, characterized in that the ultra-wideband cross-polarized antenna further includes at least one support pad provided on one side of the second substrate layer away from the ground layer.

* * * * *